US008934769B2

(12) United States Patent
Toscano et al.

(10) Patent No.: US 8,934,769 B2
(45) Date of Patent: Jan. 13, 2015

(54) OPTICAL TRANSPORT NETWORK ALARMS

(75) Inventors: Orazio Toscano, Genoa (IT); Sergio Lanzone, Genoa (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 189 days.

(21) Appl. No.: 13/511,368

(22) PCT Filed: Nov. 25, 2009

(86) PCT No.: PCT/EP2009/065850
§ 371 (c)(1),
(2), (4) Date: Sep. 5, 2012

(87) PCT Pub. No.: WO2011/063834
PCT Pub. Date: Jun. 3, 2011

(65) Prior Publication Data
US 2013/0004164 A1    Jan. 3, 2013

(51) Int. Cl.
*H04B 10/08*    (2006.01)
*H04B 17/00*    (2006.01)
*H04J 3/14*    (2006.01)

(52) U.S. Cl.
CPC ............ *H04J 3/14* (2013.01); *H04J 2203/006* (2013.01)
USPC ..................... 398/34; 398/9; 398/10; 398/17

(58) Field of Classification Search
CPC ...................... H04B 2210/071; H04B 10/0791
USPC .................................................. 398/9, 10, 17
See application file for complete search history.

(56) References Cited

U.S. PATENT DOCUMENTS 7,366,411 B2 *    4/2008    Cho et al. .................... 398/25
2001/0038471 A1 *    11/2001    Agrawal et al. ............... 359/110

(Continued)

FOREIGN PATENT DOCUMENTS

CN    WO2009021456    *    2/2009
EP        1 014 603 A2        6/2000

(Continued)

OTHER PUBLICATIONS

ITU-T, G.709: Interfaces for the Optical Transport Network, Mar. 2003, Section 16: pp. 53-56.*

(Continued)

*Primary Examiner* — David Payne
*Assistant Examiner* — Pranesh Barua
(74) *Attorney, Agent, or Firm* — Leffler Intellectual Property Law, PLLC (57) ABSTRACT

An optical transport network signal (OTM) comprising at least one optical channel is received at a first network equipment. The optical transport network signal (OTM) is processed to extract optical data units (ODUk) for each optical channel (OCh). There is detection for defects during the processing. The optical data units are retransmitted within optical transport units (OTUk) towards a second network equipment. When a defect has been detected, the retransmitting comprises inserting an optical channel transport unit alarm indication signal (OTUk-AIS) in an optical channel transport unit (OTUk) containing optical channel data units (ODUk) that are affected by the detected defect. The second network equipment detects for the presence of the optical channel transport unit alarm indication signal (OTUk-AIS) and generation of an alarm is inhibited for any optical channel data units (ODUk) contained within the optical channel transport unit that comprises the optical channel transport unit alarm indication signal (OTUk-AIS). The network equipments can comprise a WDM or DWDM equipment and a cross-connect.

14 Claims, 7 Drawing Sheets

(56) References Cited

U.S. PATENT DOCUMENTS

| | | | |
|---|---|---|---|
| 2004/0184403 A1* | 9/2004 | Ohira et al. | 370/223 |
| 2004/0213564 A1* | 10/2004 | Sakano et al. | 398/12 |
| 2005/0135805 A1 | 6/2005 | Cho et al. | |
| 2009/0269057 A1* | 10/2009 | Tanaka | 398/34 |
| 2009/0324218 A1* | 12/2009 | Fukushi et al. | 398/25 |
| 2010/0054731 A1* | 3/2010 | Oltman et al. | 398/1 |
| 2010/0135652 A1* | 6/2010 | Jiang et al. | 398/10 |
| 2010/0202772 A1* | 8/2010 | Wei et al. | 398/16 |
| 2011/0008050 A1* | 1/2011 | Ceccatelli et al. | 398/79 |

FOREIGN PATENT DOCUMENTS

| | | |
|---|---|---|
| EP | 2 061 164 A1 | 5/2009 |
| EP | 2 075 955 A1 | 7/2009 |

OTHER PUBLICATIONS

PCT International Search Report, mailed Jul. 30, 2010, in connection with International Application No. PCT/EP2009/065850.

ITU-T Standard G.709/Y.1331 "Series G: Transmission Systems and Media, Digital Systems and Networks—Digital terminal equipments—General; Series Y: Global Information Infrastructure, Internet Protocol Aspects and Next Generation Networks—Internet protocol aspects—Transport: Interfaces for the Optical Transport Network (OTN)" Mar. 2003.

ITU-T Standard G.798 "Series G: Transmission Systems and Media, Digital Systems and Networks—Digital terminal equipments—Other terminal equipment: Characteristics of optical transport network hierarchy equipment functional blocks" Dec. 2006.

ITU-T Standard O.150 "Series O: Specifications of Measuring Equipment—Equipment for the measurement of digital and analogue/digital parameters: General requirements for instrumentation for performance measurements on digital transmission equipment" May 1996.

* cited by examiner

OPTICAL TRANSPORT NETWORK ALARMS

TECHNICAL FIELD

The present invention relates to methods and apparatus for the processing of alarms in an Optical Transport Network (OTN).

BACKGROUND

Telecommunication network operators are upgrading their optical backbones to Optical Transport Networks (OTN) based on the International Telecommunications Union ITU-T G.709 hierarchy. OTN has been used for Dense Wavelength Division Multiplexed (DWDM) point-to-point links and is now being extended to larger scale networks comprising DWDM links, OTN cross-connects and other transmission equipment.

One way of evolving the currently deployed OTN point-to-point links to implement an optical switched network is to add OTN cross-connects to the existing DWDM equipment. The OTN cross-connects switch at the level of Optical Channel Data Units (ODUk). An operator typically has the options of either using DWDM equipments and OTN cross-connects from a single vendor or using DWDM equipments and OTN cross-connects from different vendors. The provision of two separate network equipments can cause issues in terms of alarm generation and reporting when a defect occurs on an optical link, particularly when the separate network equipments are provided by different vendors.

SUMMARY

Embodiments of the present invention seek to provide an improved way of processing alarm signals in network equipments which process optical channel data units. Embodiments of the present invention seek to provide an apparatus arranged to implement an improved processing of alarm signals.

A first aspect of the present invention provides a method of processing an optical transport network signal comprising at least one optical channel. The method comprises, at a first network equipment, receiving the optical transport network signal and processing the received optical transport network signal to extract optical data units for each optical channel. The method further comprises detecting for defects during the processing step and retransmitting the optical data units within optical transport units towards a second network equipment. When a defect has been detected, the retransmitting comprises inserting an optical channel transport unit alarm indication signal (OTUk-AIS) in an optical channel transport unit containing optical channel data units that are affected by the detected defect.

OTUk-AIS is a maintenance signal defined in G.709 but, currently, its insertion as consequent action of any defect is not yet specified by ITU-T. Therefore, in a standard Optical Transport Network, OTUk-AIS cannot be present. OTUk-AIS is defined in G.709 as a signal with a 2047-bit pseudo-random repeating sequence.

A second aspect of the present invention provides a method of processing an optical transport network signal at a second network equipment (20) downstream of a first network equipment (20). The method comprises receiving optical channel transport units and detecting for the presence of an optical channel transport unit alarm indication signal (OTUk-AIS) in the received optical channel transport units. The method further comprises inhibiting the generation of an alarm to an external entity, such as a network management system, for any optical channel data units (ODUk) contained within the optical channel transport unit (OTUk) that comprises the optical channel transport unit alarm indication signal (OTUk-AIS). Advantageously, the method inhibits the generation of alarms, at the second network equipment, at both the optical channel transport unit (OTUk) layer and the optical channel data unit (ODUk) layer.

Both aspects of the invention allow the second network equipment to inhibit, or suppress, generation of alarms in situations where a root defect has already been detected by, and an alarm raised by, the first network equipment. The OTUk-AIS is used as a Server Signal Fail (SSF) indication between the first network equipment and the second network equipment. Operating in this way reduces the overall number of alarms issued in the network in response to a defect, and allows a Network Management System to more quickly and accurately determine the root cause of a defect. The method is particularly useful in situations where the first and second network equipments are provided by different equipment vendors. The method is also useful in situations where the first and second network equipments are provided by the same equipment vendor but there is no mechanism for correlating alarms between the first and second network equipments.

Further aspects of the invention provide network equipments for performing the methods.

An aspect of the present invention provides a first optical transmission network equipment comprising an input for receiving an optical transport network signal comprising at least one optical channel. The equipment further comprises termination apparatus for processing the received optical transport network signal to extract optical data units for each optical channel and detect for defects. The equipment further comprises an output stage arranged to retransmit the optical data units within optical transport units towards a second network equipment. The output stage is arranged, when a defect has been detected, to insert an optical channel transport unit alarm indication signal in an optical channel transport unit containing optical channel data units that are affected by the detected defect.

Another aspect of the present invention provides a second optical transmission network equipment comprises an input for receiving optical channel transport units. The equipment further comprises termination apparatus arranged to detect for the presence of an optical channel transport unit alarm indication signal in the received optical channel transport units. The termination apparatus is arranged to inhibit the generation of an alarm for any optical channel data units contained within the optical channel transport unit that comprises the optical channel transport unit alarm indication signal.

The second optical transmission network equipment can comprise at least one of a cross-connect, an add-drop multiplexer, and a terminal.

The functionality described here can be implemented in software, hardware or a combination of these. The functionality can be implemented by means of hardware comprising several distinct elements and by means of a suitably programmed processing apparatus. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to a processing apparatus via a network connection.

BRIEF DESCRIPTION OF THE DRAWINGS

Preferred embodiments of the present invention will now be described, by way of example only, with reference to the accompanying drawings, in which.

DETAILED DESCRIPTION

Figure 1:
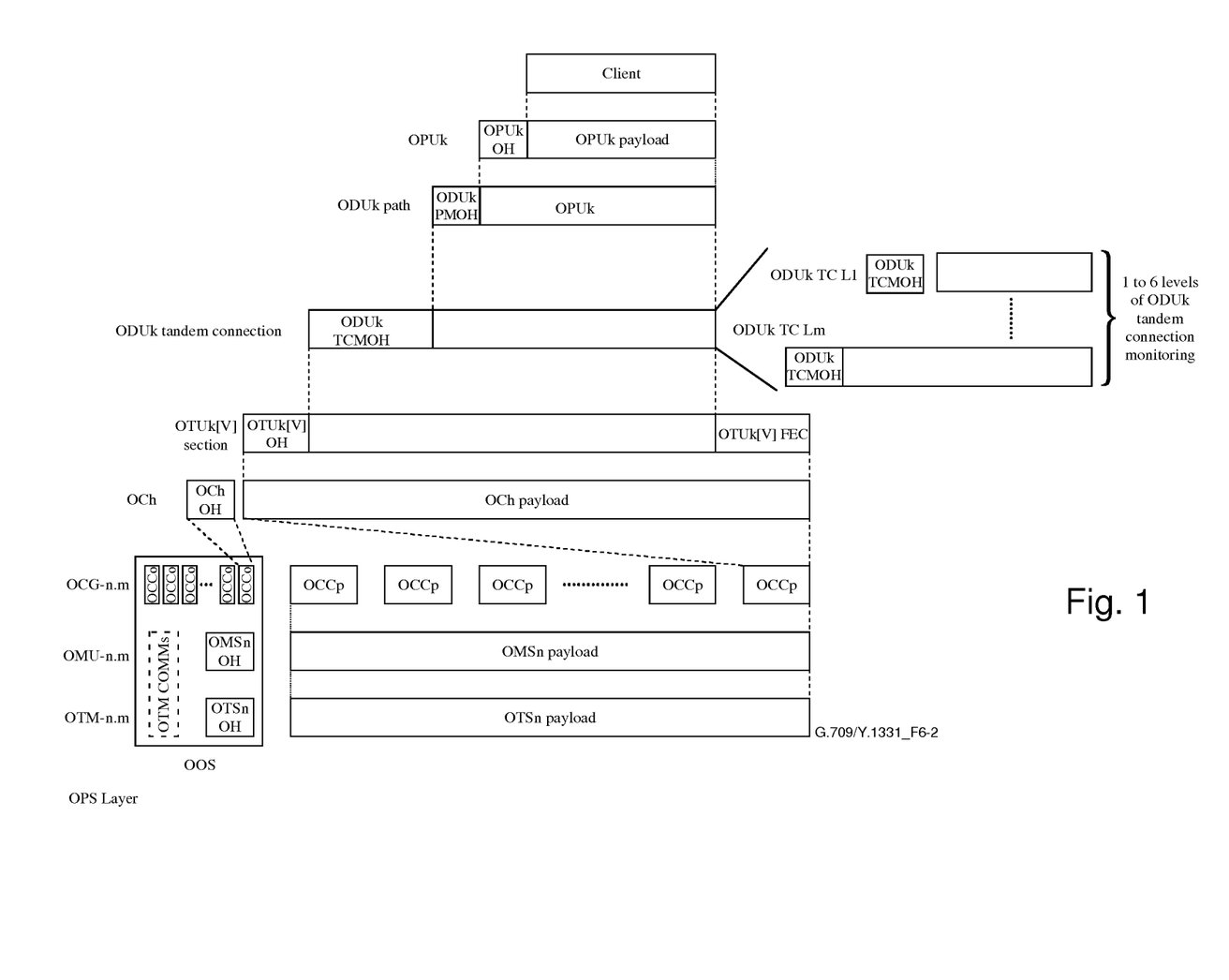
FIG. 1 shows the OTN hierarchy.

Before describing embodiments of the invention, it is considered helpful to give an overview of the hierarchy of the Optical Transport Network (OTN). FIG. 1 shows the hierarchical layers used in transporting data over an OTN. Client data can include Ethernet packets, Synchronous Digital Hierarchy (SDH) traffic, Internet Protocol (IP) packets and various other traffic types. The client data is encapsulated with an OPUk overhead to form an Optical Channel Payload Unit (OPUk), with k taking a value k=0, 1, 2, 3, 4 and indicating a particular one of the multiple supported bit rates. The OPUk is intended to be carried end-to-end between a source and sink and is not modified by the network. An Optical Channel Data Unit (ODUk) comprises a payload of an OPUk with an ODUk overhead. Again, the letter k can take a value k=0, 1, 2, 3, 4 and indicates a particular bit rate, e.g. ODU1=2.5 Gbps, ODU2=10 Gbps, ODU3=40 Gbps. An Optical Channel Transport Unit (OTUk) comprises a payload of an ODUk with an OTUk overhead and forward error correction. Finally, an optical channel (OCh) comprises an OTUk with an overhead. The OPUk, ODUk and OTUk are in the electrical domain. The OCh is carried in the optical domain and will be carried over a particular wavelength channel of a WDM or DWDM transmission system. Additional layers exist in the optical domain, beneath the optical channel. These include an Optical Multiplex Section (OMS), an Optical Transport Section (OTS) and an Optical Physical Section (OPS).

Figure 2:
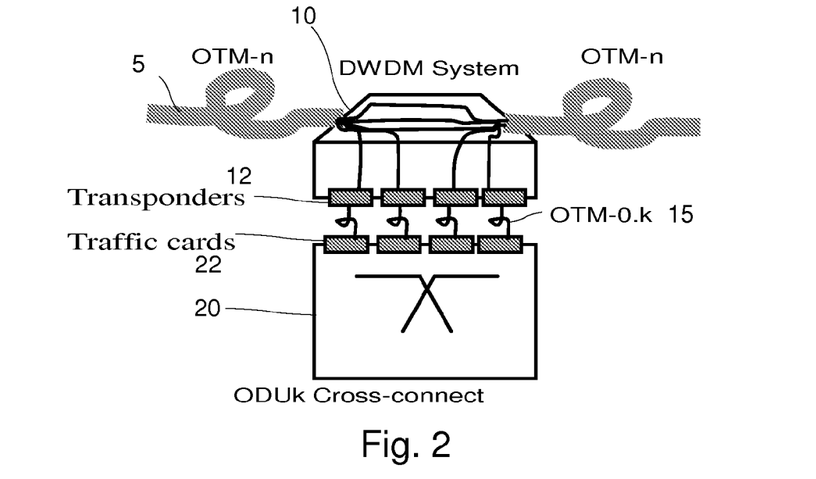
FIGS. 2 and 3 show DWDM equipment connecting to an OTN cross-connect.
Figure 3:
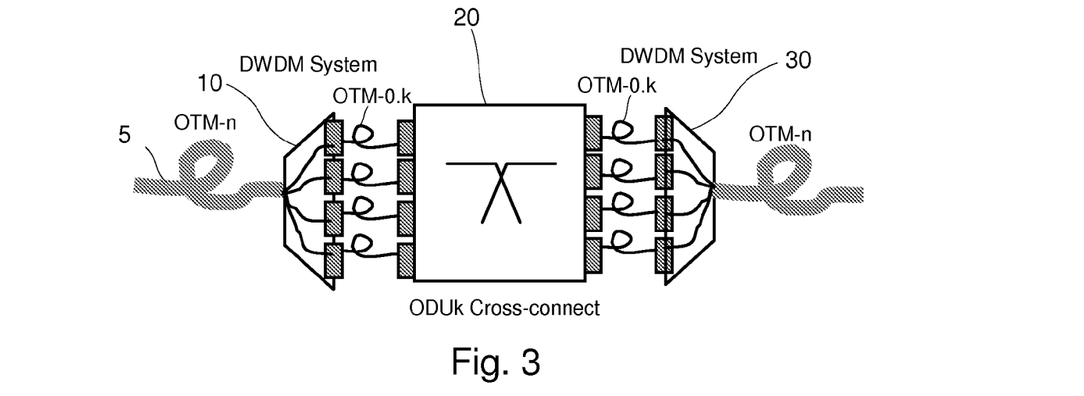

FIGS. 2 and 3 show examples of OTN network equipment. In FIG. 2 a DWDM equipment 10 connects to an optical link 5 carrying an Optical Transport Module (OTM-n) signal. The OTM-n is a signal with n Optical Channel (OCh) signals, i.e. optical channel signals on n wavelengths ($\lambda$) of a fibre. The DWDM equipment 10 receives the OTM-n signal and outputs data units received on each of the n wavelength channels ($\lambda$). The data units are sent by a set of transponders 12 on the output interface of the DWDM equipment 10 to traffic cards 22 on the input interface of a cross-connect 20. As explained above, the cross-connect operates at the ODUk level of the OTN and is called an ODUk cross-connect. The data units for each wavelength channel are carried across a separate link 15 in optical form. Typically the links 15 are "grey" interfaces OTM-0.k. Coloured interfaces (i.e. OTM-1r.k) could also be used.

FIG. 3 shows a cross-connect 20 connected to two DWDM equipments 10, 30. In FIGS. 2 and 3 the DWDM equipments 10, 30 can be supplied by a different vendor to the cross-connect 20.

Figure 4:
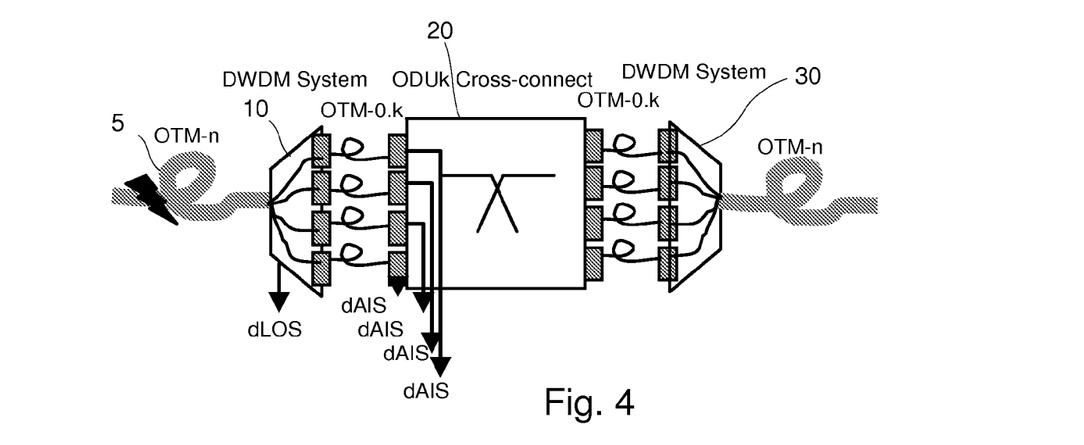
FIG. 4 shows an example of alarms generated when a fault occurs on an optical link.

FIG. 4 shows an example scenario which can occur with the equipment of FIGS. 2 and 3. The transmission system has four wavelength channels. Each optical channel carries data units which are structured as shown in FIG. 1. Suppose there is a problem on the optical link 5 carrying the optical transport modules (OTM-n) received by DWDM equipment 10. The problem could be a loss of signal defect (dLOS) or any defect at the Optical Physical Section (OPS), Optical Transmission Section (OTS) or Optical Multiplex Section (OMS) layers which can result in the insertion of consequent actions at the ODU layer in addition to the defect detected by the DWDM equipment. The consequent actions are the insertion of Alarm Indication Signals (AIS). Another example of a defect is dTIm, which can have the insertion of ODUk-AIS as a consequent action. Another example of a defect is the FDI (Forward Defect Indication) which is defined for OMS and OCh. For OMSn section monitoring, the OMSn-FDI-P signal is defined to convey in the downstream direction the OMSn payload signal status (normal or failed).

The insertion of the consequent action is performed by transponders on the DWDM equipment 10 according to ITU-T G.798 Standard. The ODU-AIS are sent to the ODUk cross-connect encapsulated in a valid OTUk (i.e. valid OUT OH and valid FEC). The ODUk cross-connect 20 will detect as many ODUk-AIS as wavelength channels ($\lambda$) affected by the defect originally detected by the DWDM equipment 10 and raise alarms to a NMS.

Figure 5:
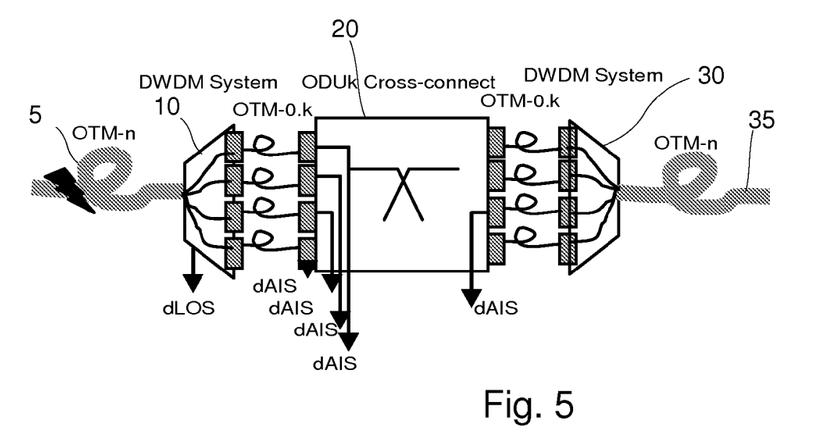
FIG. 5 shows another example of alarm generation.

FIG. 5 shows another example scenario which can occur with the equipment of FIG. 3. In this scenario an operator cannot easily discern which of the ODUk-AIS alarms raised by the ODUk cross-connect 20 are due to the failure detected on the DWDM equipment 10 (i.e. the ODUk-AIS alarms (dAIS) shown on the left) and which are due to another failure in the network (i.e. the ODUk-AIS alarms (dAIS) shown on the right).

Figure 6:
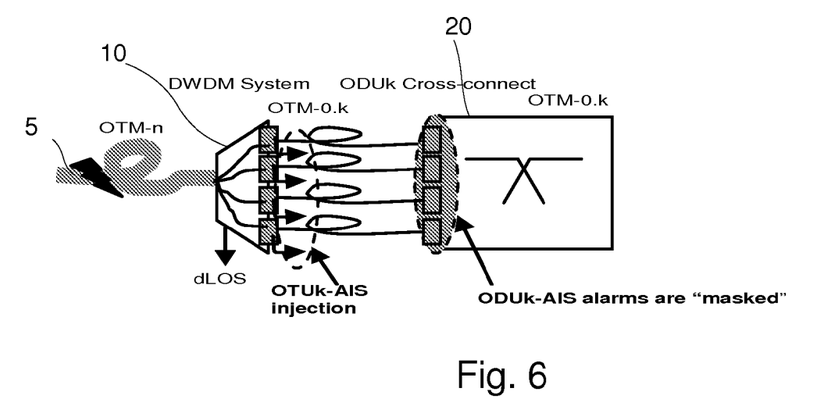
FIG. 6 shows an example of alarm generation according to an embodiment of the present invention.

FIG. 6 shows operation of equipments 10, 20 according to an embodiment of the invention. On detection of a defect at DWDM equipment 10, OTUk-AIS is injected into OTUk frames at equipment 10. This is subsequently detected at cross-connect 20, downstream of the DWDM equipment 10. The cross-connect 20 detects the presence of the OTUk-AIS inserted by the DWDM equipment 10 and masks issuing of any ODUk-AIS alarms to a NMS. Accordingly, an alarm is raised only by the equipment 10 nearest to the occurrence of the defect.

Figure 7:
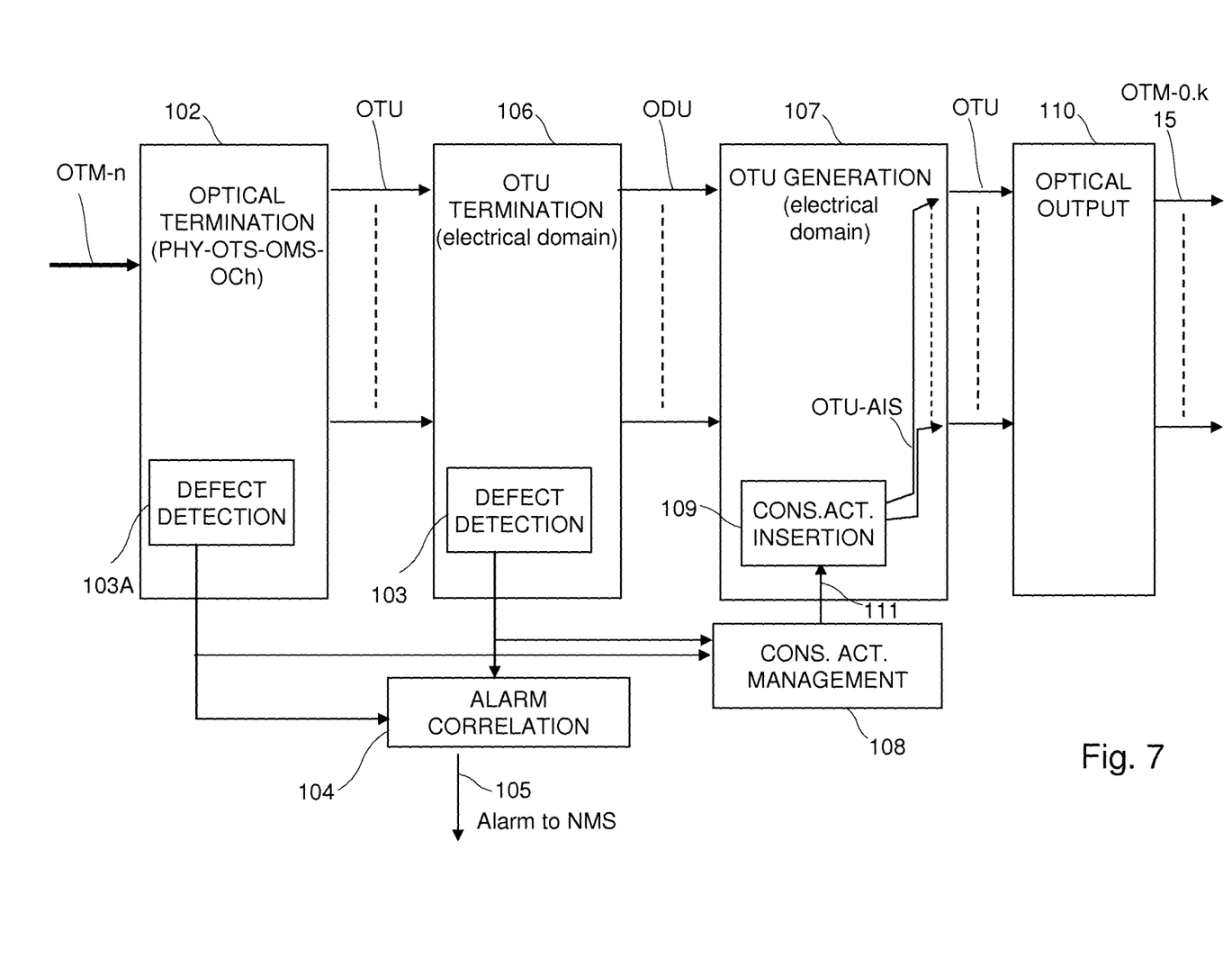
FIG. 7 shows a DWDM equipment according to an embodiment of the invention.

FIG. 7 shows the DWDM equipment 10 in more detail. At a DWDM equipment 10 the optical network signal OTM-n is received and some layers of the OTN hierarchy are terminated by an optical termination unit 102. The optical layers of the OTN are terminated, i.e. the physical layer (OPS/PHY), Optical Transport Section (OTS) layer, Optical Multiplex Section (OMS) layer and Optical Channel (OCh) layer. As part of the termination of the optical layers, a defect may be detected at one or more of the OPS, OTS, OMS and OCh layers. As part of the termination of these OTN layers, defect detection is performed by unit 103A. When a defect is detected, it is communicated to the alarm correlation unit 104.

OTUk signals are output to an OTU processing unit 106. This unit performs the OTUk OH and FEC processing. A defect detection unit 103B detects defects at this level and, when a defect is found, it is communicated to the alarm correlation unit 104.

Alarm correlation unit 104, according to ITU-T G.798, correlates all the defects detected by the different defect units 103A, 103B and issues the correct alarm 105 to a Network Management System (NMS).

Unit 106 outputs optical data units (ODU) to a unit 107 which performs OTU/ODU adaptation and OTU generation. The OTU/ODU adaptation is the function that, according to G.798, inserts ODU-AIS as a consequent action of the failures detected at OPS/OTS/OMS/OCh/OTUk levels.

Conventionally, a consequential action management function 108 will issue an instruction to generate an ODUk-AIS and a consequential action insertion function 109 generates the ODUk-AIS in the overhead section of an ODUk frame and the OTUk generation function 107 will encapsulate the ODUk into a new OTUk with OH and FEC.

However, in accordance with an embodiment of the invention, the consequential action management unit 108 does not operate in this conventional manner. Instead, the consequential action management unit 108 issues an instruction to generate an OTUk-AIS in an OTUk frame when a defect has been detected by either of the defect detection units 103A, 103B. Unit 109 generates the OTUk-AIS, when instructed to do so by the consequential action management unit 108. According to G.798, the defects that require the insertion of a consequent action are:

OPS layer (physical layer): dLOS;
OTS Layer: dLOS-P, dTIM;
OMS Layer: dLOS-P, dFDI-P;
OCh Layer: dOCI, dLOS-P, dFDI-P;
OTUk layer: dLOF, dLOM, dTIM.

Figure 8:
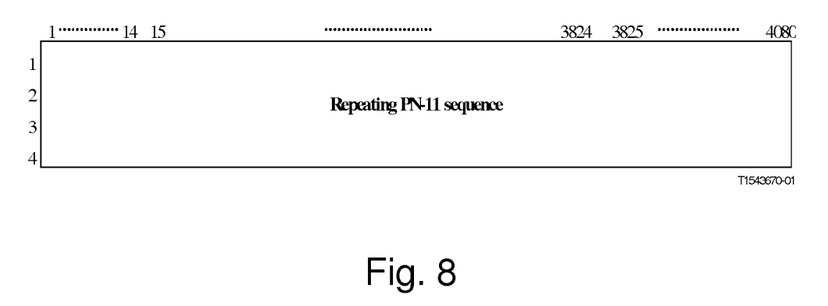
FIG. 8 shows the format of the OTUk-AIS signal.

The OTUk-AIS injected by unit 109 is a generic AIS signal as defined in G.709 section 16.6.1 and ITU-T 0.150, section 5.2. It is a signal with a 2047-bit ($2^{11}$-1) pseudorandom sequence, which can be generated using an eleven-stage shift register whose 9th and 11th stage outputs are added in a modulo-two addition stage, and the result fed back to the input of the first stage. This can also be called a polynomial number 11 (PN-11) repeating sequence. The PN-11 sequence fills the entire OTUk frame. FIG. 8 shows an OTUk frame and the extent of the PN-11 sequence. The OTUk frame is carried as an OTM-0.k signal connecting the DWDM equipment 10 to the ODUk cross-connect 20. The OTUk-AIS signal is defined in G.709 but insertion of this signal is not foreseen by G.798, which is the recommendation defining how OTN functional blocks operate. Currently, in a G.709/G.798 compliant network there is no scenario where the OTUk-AIS maintenance signal is used and therefore detectable. Therefore, when the traffic cards of the ODUk cross-connect receive an OTUk-AIS it can be only because the DWDM equipment 10 is signalling in the manner described above.

After processing in unit 107, OTUk signals are output to an optical output unit 110 which performs electrical-to-optical conversion of the signal. Signals are output from unit 110 as a set of not coloured (i.e. grey) channels named OTM-0.k (15) as defined by ITU-T G.709. This prevents optical interoperability issues between the equipments 10, 20.

Figure 9:
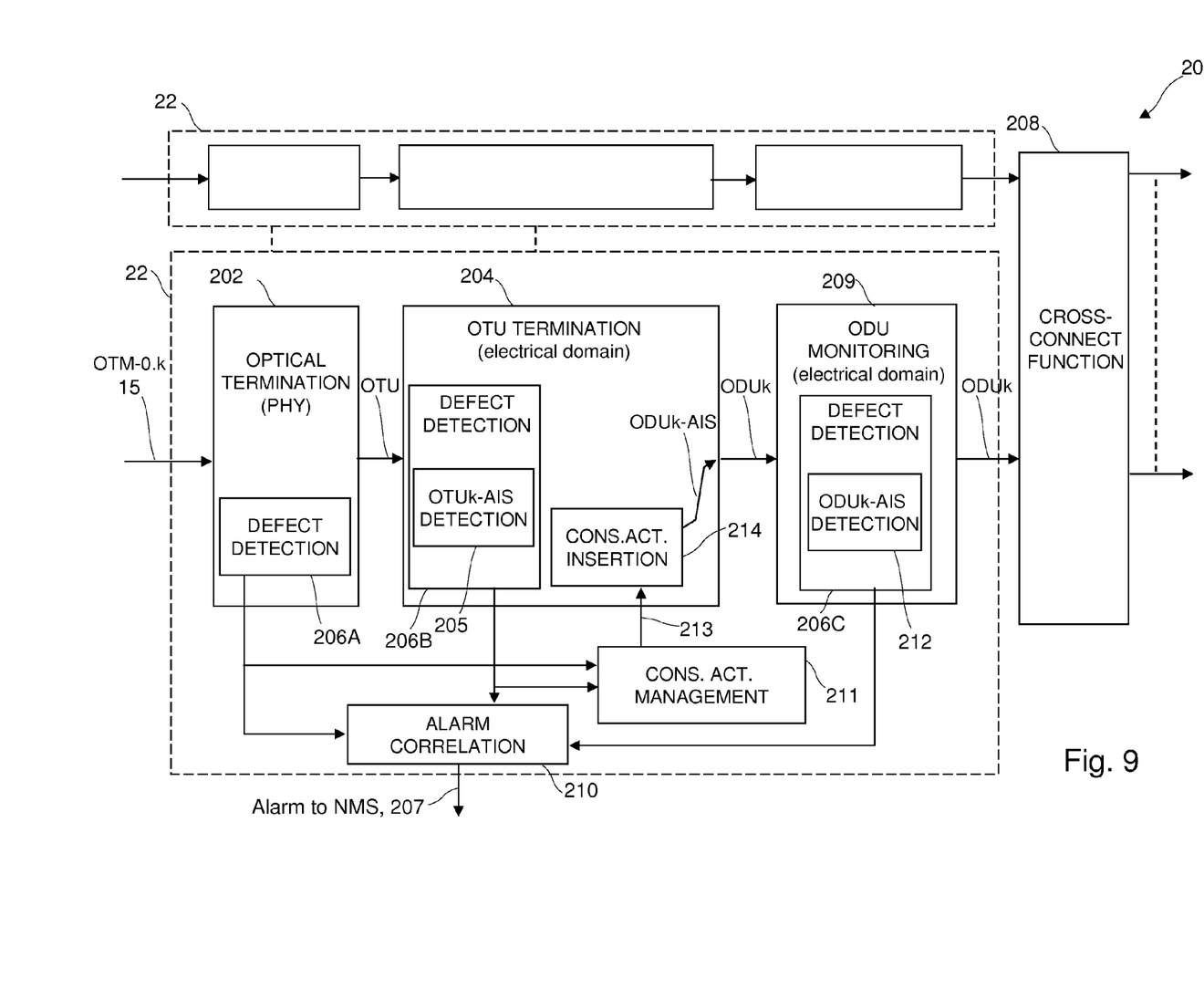
FIG. 9 shows a cross-connect according to an embodiment of the invention.

FIG. 9 shows a cross-connect 20 in more detail The set of signals output by the DWDM equipment 10 are received at traffic cards 22. Each signal is typically received in OTM-0.k form. One of the traffic cards 22 is shown in detail, and comprises an optical interface/termination unit 202, an OTU termination unit 204 and an ODU monitoring unit 209. The optical signals received on links 15 are terminated, the presence of a possible physical defect is detected by the defect detection unit 206A. If a defect is found, a signal is output to the alarm correlation unit 210 and to the consequent action management unit 211. OTUk data units are output to OTU termination unit 204. OTUk signals are decoded to the ODUk level and output to ODU monitoring function 209. Finally the ODUk is output to a cross-connect function 208. Typically, this forwards data units across a switching fabric according to a destination of each data unit. The cross-connect 208 has a set of buffers, with each buffer holding a queue of data units for each output port of the cross-connect.

OTU termination unit 204 includes a defect detection unit 206B for the detection of defects at OTUk layer. One of the detection functions is an OTUk-AIS detection function 205. All the detected defects are forwarded to the alarm correlation unit 210 and to the consequent action management unit 211.

ODU monitoring unit 209 includes a defect detection unit 206C for the detection of defects at ODUk layer. One of the detection functions is an OTUk-AIS detection function 205. All the detected defects are forwarded to the alarm correlation unit 210.

Alarm correlation unit 210 receives the defects detected from the defect detection units 206A, 206B, 206C and decides which alarm 207, if any, has to be presented to the NMS. G.798 describes rules for alarm correlation. In the case of an OTUk-AIS detected by unit 205, then the alarm correlation unit inhibits generation of an alarm 207 for that optical channel. In case of ODUk-AIS detected by unit 212 and no contemporary presence of any other server defects (i.e. defects detected by unit 206A and by unit 206B), then the alarm correlation unit issues an ODUk-AIS alarm to the NMS as per ITU-T G.798. In general, only the alarm with higher hierarchy is issued to the NMS. For example: (i) if a defect is detected at OPS layer, the alarm for that defect is issued but all the other possible defects, detected at OTUk/ODUk layers are not issued; (ii) if no defect is detected at OPS layer but a defect is detected at OTUk layer, the alarm for that defect is issued but all the other possible defects, detected at ODUk layer, are not issued. A modification of the operation of the alarm correlation unit 210 according to an embodiment of the invention, compared to G.798, is that if the defect detected at OTUk layer is OTUk-AIS, no OTUk-AIS alarm is issued for that defect and alarms for all the other possible defects detected at the ODUk layer are not issued.

Based on the defects detected by units 206A, 206B, 206C the consequent action management unit 211 issues an instruction 213 to a consequent action insertion unit 214 to inject an ODUk-AIS signal in an ODUk frame as per ITU-T G.798 Recommendation. The OTUk-AIS is a PN-11 sequence that fills all of the OTU frame, including the OH and the OTU Payload, as shown in FIG. 8. When the ODU cross-connect 20 detects the OTUk-AIS at unit 205, then consequent action management unit 211 causes consequent action insertion unit 214 to inject an ODUk-AIS. This comprises adding a valid Frame alignment word to the OH and a particular code in the PM byte of the ODU-OH. The contents of the remaining part of the ODUk-OH and ODU payload can take any value.

Figure 10:
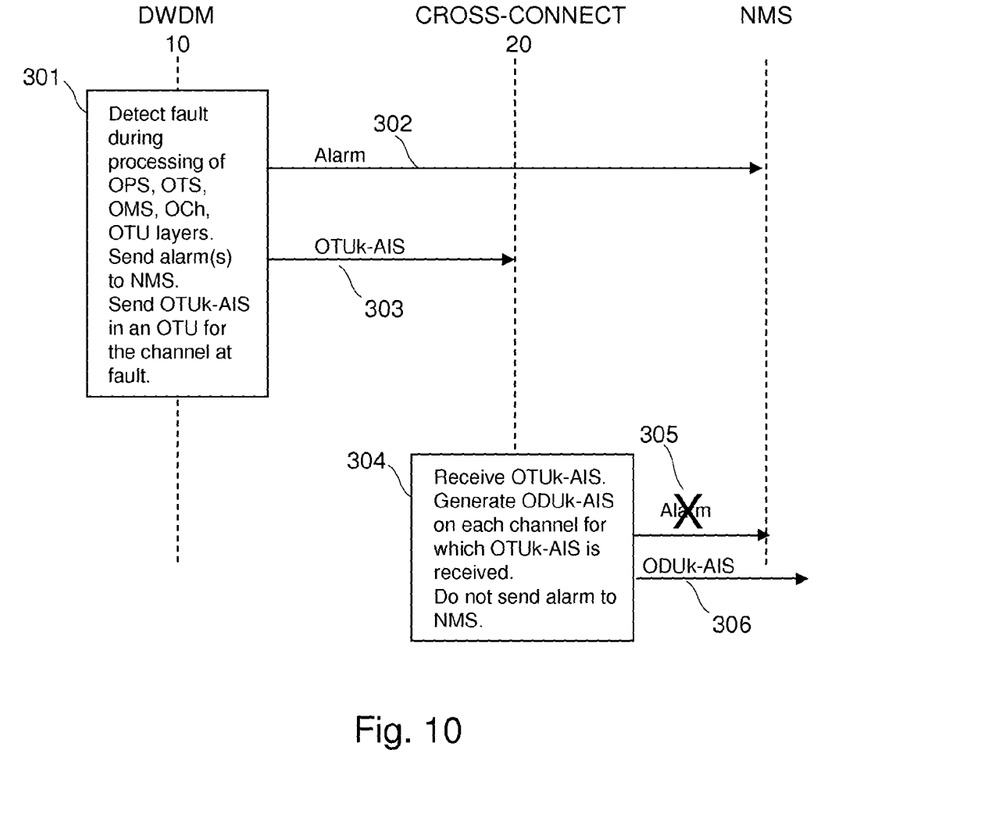
FIG. 10 shows a method of operating DWDM equipment connected to an OTN cross-connect.

FIG. 10 shows steps of the method performed by the equipments 10, 20 shown in FIGS. 9 and 10. At step 301a DWDM equipment 10 detects a fault when processing at least one of the Physical, OTS, OMS, OCh and OTUk layers. If a defect is found, an alarm 302 is sent to the NMS. Also, OTUk-AIS 303 is generated in the OTUk frames affected by the detected defect. The OTUk frames are forwarded to the cross-connect 20. At cross-connect 20, the frames are received. In situations where a defect was detected at the DWDM equipment 10, the received signal contains OTUk-AIS. At step 304 cross-connect 20 detects the OTUk-AIS. Detecting OTUk-AIS causes the cross-connect 20 to inhibit generation of an alarm 305 to the NMS. Cross-connect 20 generates ODUk-AIS on each channel on which OTUk-AIS is detected, to fulfil the requirements of G.798. At step 306 the ODUk units are forwarded, across the cross-connect, to another network node. Operating in this manner results in the NMS receiving one alarm at step 302, rather than the NMS receiving an alarm at step 302 and a further burst of alarms at step 305. In the case of a failure in the network, the ODUk cross-connect 20 receives an ODUk-AIS encapsulated inside an OTUk. It reacts by raising the dODUk-AIS alarm (as required by G.798), as in this case it is certain that the failure is not in the DWDM equipment, but somewhere else in the network.

Figure 11:
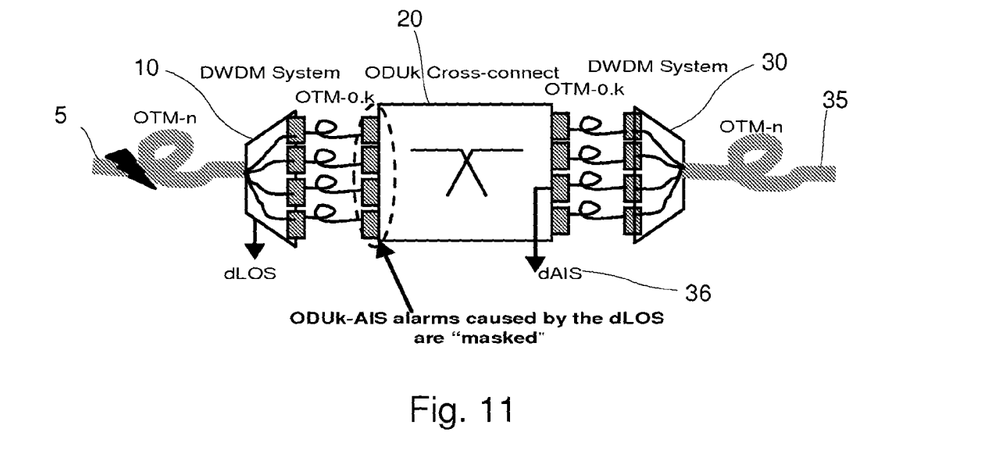
FIG. 11 shows an OTN cross-connect coupled to two DWDM equipments.

FIG. 11 shows an OTN cross-connect 20 coupled to two DWDM equipments 10, 30. Each DWDM equipment 10, 30 operates as described above. A defect occurring on link 5 is detected at DWDM equipment 10 and an alarm is raised by the DWDM equipment 10 to a NMS. DWDM equipment 10 generates OTUk-AIS on all channels affected by the defect. Cross-connect detects the OTUk-AIS and suppresses the generation of further alarms at the OTUk and ODUk layers. In this way, the defect is detected and reported by the network equipment nearest the defect (in link 5), without the OTN cross-connect 20 generating unnecessary additional alarms. DWDM equipment 30, connected to link 35, operates in a similar manner as equipment 10. This will ensure that defects in link 35 are detected and reported by DWDM equipment 30, and do not raise further alarms at cross-connect 20. If a defect should occur at cross-connect 20 on the interface with DWDM equipment 10, or the interface with DWDM equipment 30, or in another part of the network, apart the DWDM equipment, the interface detects and reports the alarm. In FIG. 11 a ODUk-AIS defect is detected at cross-connect 20 on the interface with the DWDM equipment 30 and is reported 36.

Figure 12:
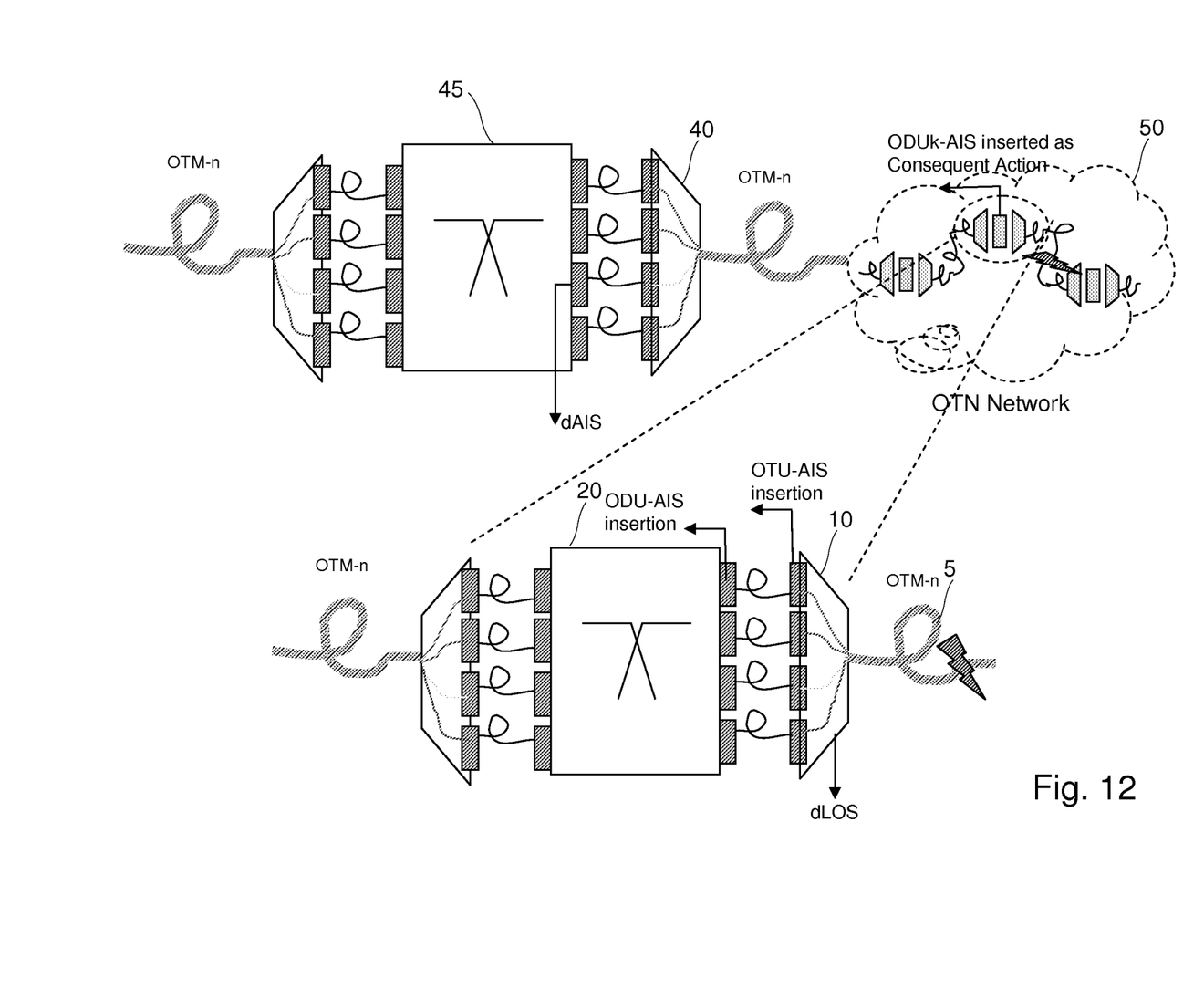
FIG. 12 shows an OTN network with cross-connects and DWDM equipments.

FIG. 12 shows another embodiment of the invention. A DWDM equipment 10 and cross-connect 20 form part of an OTN network 50. Following a failure in the middle of the network (e.g. a break of a fibre 5), DWDM equipment 10 detects LOS in the ingress side. DWDM equipment 10 forwards an OTU-AIS to the ODUk cross-connect 20. The ODUk cross-connect 20 detects the OTUk-AIS and will inject an ODUk-AIS into a valid OTUk sent to the next DWDM equipment. So, from that point on there is an ODUk-AIS in the network inside a valid OTUk. When this signal reaches any downstream node, the DWDM equipment 40 at that node does not detect any alarm because the OTUk is valid and the DWDM equipment is not required to monitor the ODUk. Therefore, the DWDM equipment 40 does not detect any defect, and the ODUk cross-connect 45 detects the ODUk-AIS because the ODUk cross-connect 20 is required to monitor also the ODUk.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of processing an optical transport network signal comprising at least one optical channel, the method comprising,
   at a first network equipment:
      receiving the optical transport network signal;
      processing the received optical transport network signal to extract optical data units for each optical channel;
      detecting for defects during the processing step;
      retransmitting the optical data units within optical transport units towards a second network equipment;
      when a defect has been detected, the retransmitting comprises inserting an optical channel transport unit alarm indication signal in an optical channel transport unit containing optical channel data units that are affected by the detected defect; and
      when the defect has been detected, transmitting an alarm signal towards a network management system; and
   at the second network equipment:
      receiving the optical channel transport units at the apparatus;
      detecting for the presence of the optical channel transport unit alarm indication signal; and
      inhibiting the generation of an alarm signal towards the network management system for any optical channel data units contained within the optical channel transport unit that comprises the optical channel transport unit alarm indication signal.

2. A method as claimed in claim 1 wherein the processing comprises:
   terminating optical channels and detecting for defects;
   terminating the optical transport unit obtained from the terminated optical channels of the optical transport module and detecting for defects; and
   extracting optical data units from the optical transport units.

3. A method according to claim 1 wherein the optical transport network signal comprises a multiplex of optical channels and the first network equipment is a wavelength division demultiplexer, the receiving comprising:
   terminating an optical physical layer, an optical transmission section and an optical multiplex section of an optical transport module received by the wavelength division demultiplexer; and
   detecting for defects when terminating at least one of the optical physical layer, the optical transmission section and the optical multiplex section.

4. A method as claimed in claim 1, wherein the optical transport unit alarm indication signal is inserted into the optical channel transport unit instead of inserting an optical data unit alarm indication signal into an optical channel data unit when a defect has been detected.

5. A method as claimed in claim 1, wherein the optical channel transport unit alarm indication signal is inserted upon detection of a defect in at least one of: physical layer, optical channel transmission module layer, optical channel transmission section layer, optical channel multiplex section layer, optical channel layer, optical transport unit layer.

6. A method as claimed in claim 1, further comprising, at the second network equipment:
   inserting an optical channel data unit alarm indication signal into any optical channel data units contained within the optical channel transport unit, as a consequent action of detecting the presence of the optical channel transport unit alarm indication signal.

7. A method of processing an optical transport network signal comprising, at a second network equipment downstream of a first network equipment:
- receiving optical channel transport units;
- detecting for the presence of an optical channel transport unit alarm indication signal in the received optical channel transport units; and
- inhibiting the generation of an alarm signal towards a network management system for any optical channel data units contained within the optical channel transport unit that comprises the optical channel transport unit alarm indication signal.

8. A method as claimed in claim 7, further comprising:
- inserting an optical channel data unit alarm indication signal into any optical channel data units contained within the optical channel transport unit, as a consequent action of detecting the presence of the optical channel transport unit alarm indication signal.

9. A method as claimed in claim 7, wherein the second network equipment comprises at least one of a cross-connect, an add-drop multiplexer, and a terminal.

10. An optical transmission network system comprising
a first optical transmission network equipment comprising:
- an input for receiving an optical transport network signal comprising at least one optical channel;
- termination apparatus for processing the received optical transport network signal to extract optical data units for each optical channel, wherein the termination apparatus is arranged to detect for defects; and
- an output stage arranged to retransmit the optical data units within optical transport units towards a second network equipment; wherein when a defect has been detected, the output stage is arranged to insert an optical channel transport unit alarm indication signal in an optical channel transport unit containing optical channel data units that are affected by the detected defect; and the output stage is further arranged to, when the defect has been detected, transmit an alarm signal towards a network management system; and the second optical transmission network equipment comprising:
- an input for receiving optical channel transport units; and
- termination apparatus arranged to detect for the presence of an optical channel transport unit alarm indication signal in the received optical channel transport units, wherein the termination apparatus is arranged to inhibit the generation of an alarm signal towards the network management system for any optical channel data units contained within the optical channel transport unit that comprises the optical channel transport unit alarm indication signal.

11. An optical transmission network equipment comprising:
- an input for receiving optical channel transport units; and
- termination apparatus arranged to detect for the presence of an optical channel transport unit alarm indication signal in the received optical channel transport units, wherein the termination apparatus is arranged to inhibit the generation of an alarm signal towards a network management system for any optical channel data units contained within the optical channel transport unit that comprises the optical channel transport unit alarm indication signal.

12. An optical transmission network equipment as claimed in claim 11 wherein the termination apparatus is further arranged to insert an optical channel data unit alarm indication signal into any optical channel data units contained within the optical channel transport unit, as a consequent action of detecting for the presence of the optical channel transport unit alarm indication signal.

13. An optical transmission network equipment as claimed in claim 11 wherein the network equipment comprises at least one of a cross-connect, an add-drop multiplexer, and a terminal.

14. A non-transitory machine-readable storage medium having stored thereon instructions which, when executed by a processor, cause the processor to perform a method of processing an optical transport network signal comprising, at a second network equipment downstream of a first network equipment:
- receiving optical channel transport units;
- detecting for the presence of an optical channel transport unit alarm indication signal in the received optical channel transport units; and
- inhibiting the generation of an alarm signal towards a network management system for any optical channel data units contained within the optical channel transport unit that comprises the optical channel transport unit alarm indication signal.

* * * * *